United States Patent [19]

Sandrock et al.

[11] Patent Number: 4,566,281
[45] Date of Patent: Jan. 28, 1986

[54] REACTION HEAT STORAGE METHOD FOR HYDRIDE TANKS

[75] Inventors: Gary D. Sandrock, Ringwood, N.J.; Edwin Snape, Suffern, N.Y.

[73] Assignee: Ergenics, Inc., Wyckoff, N.J.

[21] Appl. No.: 11,194

[22] Filed: Feb. 12, 1979

[51] Int. Cl.$^4$ .................. F17C 7/02; F17C 11/00; F26B 5/04
[52] U.S. Cl. .......................... 62/48; 55/74; 165/47; 165/10
[58] Field of Search ............... 62/48; 55/74; 34/15; 165/7, 10, 47; 123/DIG. 12, 1 A

[56] References Cited

U.S. PATENT DOCUMENTS

| | | | |
|---|---|---|---|
| 2,083,732 | 6/1937 | Moore et al. | 165/4 X |
| 2,663,626 | 12/1953 | Spangler | 62/48 X |
| 3,108,445 | 10/1963 | Portzer et al. | 62/48 |
| 3,142,159 | 7/1964 | Berlad | 62/48 |
| 3,151,467 | 10/1964 | Cohen et al. | 62/48 |
| 3,839,847 | 10/1974 | Banikiotes et al. | |
| 4,036,944 | 7/1977 | Blytas | |
| 4,165,569 | 8/1979 | Mackay | 62/48 X |
| 4,185,979 | 1/1980 | Woolley | 62/48 |
| 4,187,092 | 2/1980 | Woolley | 62/48 |

FOREIGN PATENT DOCUMENTS 14210 3/1977 Japan ................................ 62/48

Primary Examiner—Albert W. Davis, Jr.
Attorney, Agent, or Firm—Charles E. Baxley

[57] ABSTRACT

A system for hydrogen storage including a hydridable material associated with an amount of inert material of high heat capacity sufficient in amount to prevent, during hydriding, the temperature of the combined hydridable material-inert material from rising beyond that temperature at which the hydride of the hydridable material exhibits a hydrogen pressure equal to the partial pressure of hydrogen fed to the system. The system is insulated to inhibit heat transfer into or out of the system.

4 Claims, 2 Drawing Figures

U.S. Patent  Jan. 28, 1986  4,566,281

REACTION HEAT STORAGE METHOD FOR HYDRIDE TANKS

The present invention is concerned with devices wherein a material, usually gas, is sequentially absorbed and desorbed from a sorbent material. More particularly, the invention is concerned with the devices wherein hydrogen is absorbed by and desorbed from a hydridable material.

PROBLEMS, DISCOVERY AND OBJECTS

In the devices of the kind in question, it is generally the case that heat is given off when one material is absorbed in another, i.e., the reaction is exothermic. When it is desired to desorb the one material from the other, it is generally necessary to supply heat, i.e., the reaction is endothermic. The present invention is concerned with means of employing the exothermic heat of sorption in the endothermic reaction of desorption.

Figure 1:
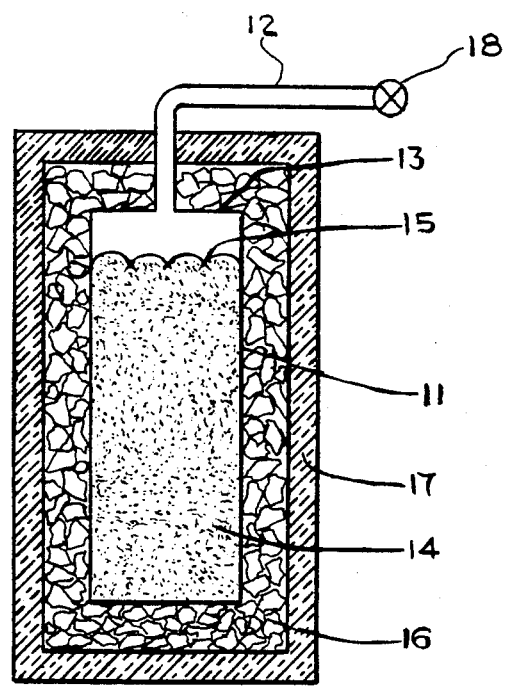
Figure 2:
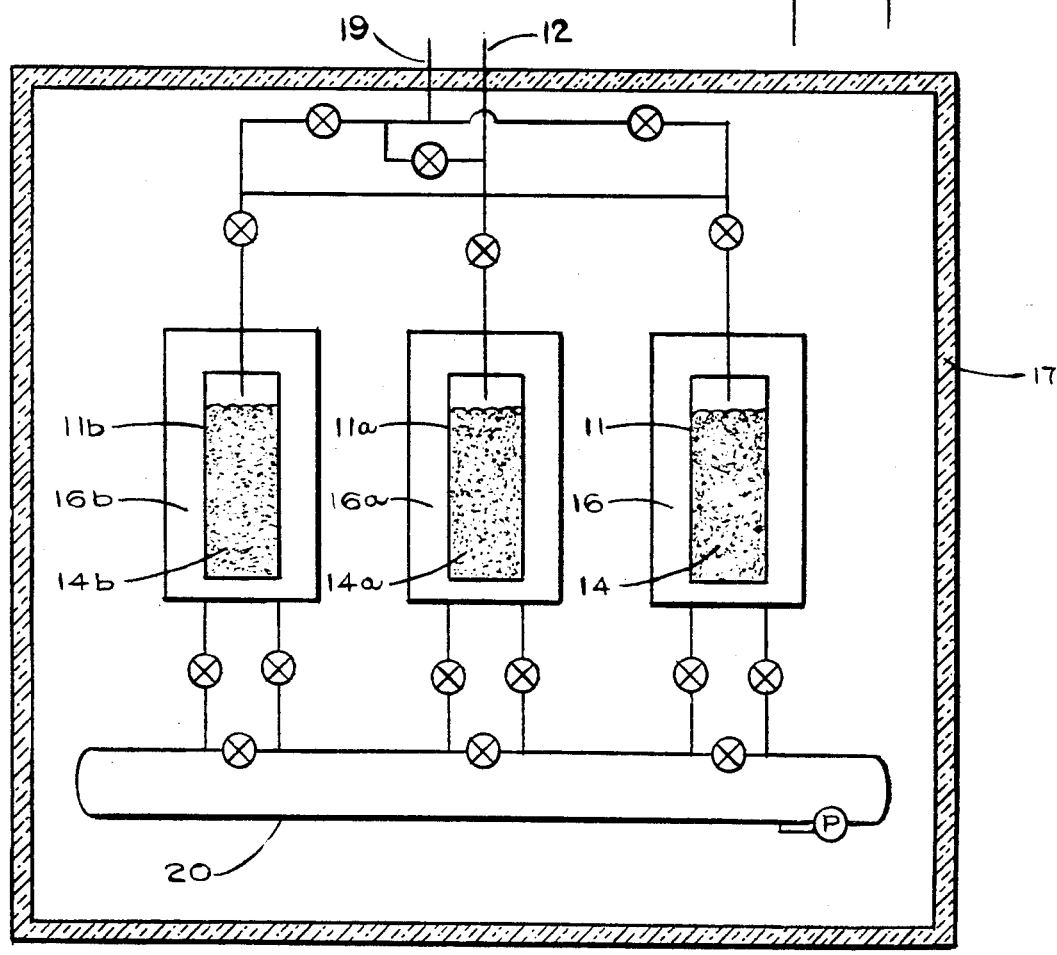

Other objects and advantages will become apparent from the following description taken in conjunction in the drawing in which FIG. 1 depicts a device in accordance with the present invention, and FIG. 2 depicts an alternative device in accordance with the present invention.

GENERAL DESCRIPTION

In general, the present invention contemplates a device or system comprising a containment means containing sorbing material, a heat storage means in heat transfer connection with said sorbing material, and an insulation layer or other heat transfer barrier external to the heat storage means.

The device or system of the present invention is illustrated in FIG. 1. Referring now thereto containment means 11 comprises a pressure resistant bottle having hydrogen gas line 12 entering through top 13 of the bottle. Containment means 11 contains hydridable metal 14 and filter 15 which prevents transfer of solid hydridable material or hydride thereof into hydrogen gas line 12. In operation, hydrogen is forced under pressure through line 12 into containment means 11 at which point it combines with hydridable metal 14 to form a metal hydride. This hydriding reaction releases heat which passes to heat storage medium 16 positioned between containment means 11 and heat insulation means 17. When one wishes to desorb hydrogen from the hydrided metal 14, valve 18 in hydride gas line 12 is opened and heat stored in heat storage medium 16 provides the heat necessary to maintain the endothermic desorption reaction at a reasonable rate. Heat insulative means 17 minimizes transfer of stored heat to any point exterior of the containment means heat storage medium system. Of course, if desired, means can be provided to introduce heat or remove heat through insulative means 17 in order to avoid either too great a build-up or decrease in temperature within insulative means 17. Such means are especially useful at times when ambient external temperatures are far removed from the designed-for ambient external temperature. In any device or system as schematically depicted in FIG. 1, it is usual to have hydrogen available for storage at or about some specified pressure. Any sorbent material will have a theoretical maximum capacity and an ascertainable total heat of reaction for capacity storage. In addition, it will possess a equilibrium absorbing pressure which rises with temperature. It is essential in accordance with the teachings of the present invention that sufficient heat storage capacity be available with respect to the quantity of sorbent material so that the equilibrium absorbing pressure will not reach the supply pressure of hydrogen until at least about 60% of the storage capacity of the sorbent material is utilized. Advantageously, heat storage capacity will be sufficient to absorb theoretical maximum heat of reaction of absorption without the equilibrium absorption pressure exceeding the supply pressure of hydrogen gas.

The heat storage medium can be a simple sensible heat absorber using a material of relatively high heat capacity and low cost, for example, liquid water, rock, etc. Alternatively the heat storage medium can involve a phase change, such as ice/water, Glauber's salt, water/steam. Still further a heat storage medium can be a combination of sensible heat storage plus phase change storage using either a single phase material or a mixed phase material.

As shown schematically in FIG. 2, containment means 11 can be a plurality of containment means 11, 11a, 11b, etc. associated with heat storage means 16, 16a, 16b, etc. and contained sorbent masses 14, 14a, 14b, etc. Appropriate valving in hydrogen charging line 12 and discharging line 19 enables alternate, sequential or simultaneous charging or discharging of hydrogen from containment means 11, 11a, 11b, etc. Similarly valving-piping circulating system 20 enables transfer of heat storage media (usually fluid, example liquid, or possibly granular solid) to that one or more of containment means 11, 11a, 11b, etc. which at any given time requires heat transfer capacity. Schematically, insulative means 17 is depicted in FIG. 2 as surrounding the entire grouping of containment means. In practice, it is more likely that each heat storage mediumcontainment means unit will be insulated, as well as, the piping and valving circulating means connecting the units.

The system of the present invention as depicted in FIGS. 1 and 2 shows the heat storage medium external to the containment means. This is not necessary. Some or all of the heat storage medium can be within the containment means. It is specifically contemplated to provide part sensible heat storage by solid bodies, rock, metal, metal powder, etc. non-reactive with hydride or hydridable material inside the containment means and the remainder of heat storage as latent heat storage or phase change heat storage external to the containment means. In certain instances, however, phase change heat storage material can be incapsulated in non-reactive encapsulating material and used inside the containment means.

In calculating total heat absorbtion ability of the system one should consider

A heat absorbtion ability of the sorbent (sorbent hydride=$M_1 C_{p1}$

B heat absorbtion ability of the containment means=$M_2 C_{p2}$

C heat absorbtion ability of the sensible heat storage means=$M_3 C_{p3}$

D heat absorbtion ability of the phase change storage medium below the phase change temperature=$M_4 C_{p4}$ E heat absorbtion ability of the phase change storage medium above the phase change temperature=$M_4 C_{p5}$, and F heat of the phase change $M_4 \Delta H$ where $M_1$ = average mass of hydridable material — hydride of such material $C_{p1}$ = average heat capacity of the material — material hydride $M_2$ = mass of the containment means $C_{p2}$ = heat capacity of the containment means $M_3$ = mass of latent heat storage material $C_{p3}$ = heat capacity of sensible heat storage material $M_4$ = mass of phase change material $C_{p4}$ = heat capacity of phase change material below the phase change $C_{p5}$ = heat capacity of phase change material above the phase change $\Delta H$ = heat of phase change In determining the mass of heat storage material required for any situation, generally one can initially determine the amount of heat theoretically generated by hydriding the available hydride storage material. At least about 60% of this generated heat must be stored without the temperature rising from initial temperature $T_1$ to the absorbtion pressure equilibrium temperature $T_2$ at which the absorbtion pressure equals the hydrogen supply pressures. If a phase change material which changes phase in the range of $T_1$ to $T_2$ is available, the heat of phase change of the available mass of this material is calculated and subtracted from 60% of the heat of hydriding reaction. This leaves the amount of heat which must be stored in storage medium, containment means, hydrided alloy etc. over a temperature increment of $T_2$ minus $T_1$. Substraction of all heat storage capabilities over this temperature increment except that of the storage medium leaves a figure from which the mass of sensible heat storage medium can be obtained by dividing by the temperature increment and the heat capacity of the storage medium. It is to be noted that while the minimum mass of heat storage medium (either sensible or phase change material) can be calculated in this fashion or in essentially the reverse thereof it is highly advantageous to use more mass of heat storage material than the minimum and to calculate $\Delta T$ on a conservative basis so that when maximum hydriding reaction occurs there still remains a $\Delta P$ with respect to the hydrogen source pressure as compared to the equilibrium hydrogen pressure of hydriding.

Hydrogen storage materials can be any of the HY-STOR ™ materials sold by MPD Technology Corp. of Waldwick, NJ such as alloys having the chemical formulas of FeTi, $(Fe_{0.9}Mn_{0.1})$ Ti, $(Fe_{0.8}Ni_{0.2})$ Ti, $CaNi_5$, $(Ca_{0.7}M_{0.3})Ni_5$, $(Ca_{0.2}M_{0.8})$ $Ni_5$, $MNi_5$, $LaNi_5$, $(CFM)Ni_5$, $LaNi_{4.7}Al_{0.3}$, $MNi_{4.5}Al_{0.5}$, $Mg_2Ni$ and $Mg_2Cu$ (M = mischmetal and CFM = cerium free mischmetal). Other reversible hydride-forming materials, either metals or non-metals, can also be used in the systems of the present invention.

Materials useful for isothermal heat storage owing to a phase change can be readily selected from standard reference sources such as the Temperature, Pressure, Heat and Entropy Change of Transition, Fusion and Vaporization Table in *American Institute of Physics Handbook* 2nd Ed. McGraw Hill Book Company 1963. For example, $MgCl_2.6H_2O$ fusing at about 350° K. with a $\Delta H$ of 8.2 kcal/mole, Rochelle salt fusing at about 350° K., Glauber's salt fusing at about 305° K. and water fusing at about 273° K. are examples of phase changes at temperatures at which some hydridable materials will absorb hydrogen under reasonable pressure. Sensible heat storage materials are usually the cheapest, eg. liquid water or rock. Any table of specific heats will show however that relatively cheap solids such as hydrated calcium sulfate, Epsom salts, alum and hydrated sodium thiosulfate possess heat capacities which are generally higher than those of rock.

EXAMPLES

In order to demonstrate the advantages of the present invention, the discharge characteristics of a hydride tank were determined under three specific conditions: (a) using no reaction heat storage (i.e., only the sensible heat of the tank and hydride itself) (outside the scope of the invention); (b) using sensible heat storage in the form of heated water; and, (c) using phase change heat storage in the form of melted sodium sulfate decahydrate ($Na_2SO_4.10H_2O$).

The same hydride and container was used for each test. The container was a 5 cm O.D. stainless steel cylinder containing 1.97 kg of powdered $Ca_{0.7}M_{0.3}Ni_5$, where M is mischmetal. Fully charged to about 21.4 atmospheres absolute $H_2$ pressure under equilibrium conditions, this amount of hydride has a storage capacity of about 240 standard liters of hydrogen. Before starting each test the tank was discharged to about 1 atmosphere absolute at room temperature. The heat storage medium (if used) was also equilibriated at room temperature. Each example then consisted of the following procedure:

1. A rapid charge at 21.4 atmospheres absolute applied $H_2$ pressure for 15 minutes.
2. A storage period of one hour during which no $H_2$ was admitted to the cylinder.
3. A discharge period starting at an initial outflow of 3.0 standard liters/minute, maintaining this outflow as long as possible, after which the maximum flow rate was monitored as a function of time. Pressure was also monitored as a function of time during the entire discharge. The longer the full 3.0 std. 1/min. outflow could be maintained the better was the performance of the tank.

It should be understood that specific conditions chosen above are arbitrary and serve simply to illustrate the relative advantages of the invention.

A. Free Tank (No Heat Storage)

During charging, the tank supported in air became very hot (too hot to comfortably touch). During charging, and especially during the one hour hold period, much of this heat was lost to the ambient surroundings as the tank cooled. During the discharge steps, the 3.0 1/min. discharge rate could be sustained for only 14.5 minutes at which time the tank had become cold and the pressure had dropped to almost 0 psig. The flow rate then dropped rapidly to less than 0.5 1/min., that low flow rate being determined mostly by the rate at which heat from the ambient air could enter the tank and provide the heat of dissociation, a relatively slow process.

B. Sensible Heat Storage

For the second test, the cylinder was placed in a 13 cm. I.D. glass tank with 4.0 liters (4.0 kg) of water. The glass tank was surrounded by 2.0 cm. thick styrofoam insulation to maintain near-adiabatic conditions. The water was stirred during the test to maintain temperature uniformity. Before charging was started the water temperature was 22.4° C. After the 15 minute charge period the water temperature had risen to 34.5° C., representing a stored reaction energy of about 48.4 kcal, about what would be expected from the amount of $H_2$ absorbed and the 6.5 kcal/mol $H_2$ heat of reaction of this hydride. After the one hour hold period the temperature was still 34.1° C., i.e., the reaction heat was still almost fully stored in the warm water. During discharge 48.5 minutes of 3.0 l/min. sustained flow was obtained compared to only 14.5 for the tank with no heat storage. This demonstrates the dramatic advantage of the reaction heat storage concept.

C. Latent Heat Storage

The third test used the melting of sodium sulfate decahydrate ($Na_2SO_4.10H_2O$) for reaction heat storage. $Na_2 SO_4.10H_2O$, with an effective heat of fusion of about 58 kcal/kg, has been used as a latent heat medium for solar heat storage. For our purposes the hydride tank described above (in the discharged condition) was suspended in a 7.5 cm I.D. glass cylinder into which was poured 2.1 kg of $Na_2 SO_4.10H_2O$ which has then allowed to equilibrate at room temperature (22.4° C). Actually only about 1 kg of salt was needed but the geometry of the available tube was such that excess salt was needed to fill the void space in the bottom of the tube. This latter material, for all practical purposes, did not take part in the experiment. For insulation purposes, the glass tube (containing the tank and heat storage salt) was surrounded by an approximately 5 cm thick layer of vermiculite.

The tank, in the configuration described above, was given the same charge (15 min. at 21.4 atmospheres absolute), hold (1 hour), and discharge (3.0 std. l/min.) sequence as experiments A and B above. During charging, the heat generated melted the salt in the vicinity of the tank. The stored latent heat of fusion was very useful in supplying the endothermic heat of dissociation. During discharge salt was observed to solidify on the surface of the tank, a clear indication the latent heat of salt solidification was entering the tank as desired.

Discharge using latent heat storage, is comparable to discharge which used sensible heat ($H_2O$) storage. The discharge rate of 3.0 std. l/min was maintained about 46 minutes using latent heat storage. The relative advantage of the latent heat storage is that less mass and volume is required than for sensible heat storage. The disadvantage of molten salt storage is higher cost and certain cycling problems that might occur. It is well known from solar energy research that $Na_2SO_4.10H_2O$, for example, does show undesirable supercooling and degradation effects after a number of cycles.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. An absorption-desorption system comprising
   a. hydridable material and hydrogen characterized by exothermicity during absorption and endothermicity during desorption; said hydridable material being confined in a containing means and said means including a conduit through which hydrogen as a gas is fed into said containing means at a specified feed pressure;
   b. a heat storage medium in heat transfer connection with said hydridable material; and
   c. a heat transfer barrier external said hydridable material and said heat storage medium wherein the mass of said containing means, said hydridable material, and said heat storage medium is sufficient to absorb at least about 60% of the heat generated by absorbing the maximum capacity of said hydrogen in said hydridable material without the temperature of said hydridable material rising from an initial temperature to a temperature at which said hydridable material will have an equilibrium hydrogen pressure equal to said specified feed pressure.

2. A system according to claim 1 wherein at least a part of said heat storage medium is internal said containing means.

3. A system according to claim 1 wherein said heat storage medium is external said containing means.

4. An absorption-desorption system comprising (a) a metallic hydride former confined in a containing means, said metallic hydride former being characterized by exothermicity during absorbtion and endothermicity during desorption and said containing means including a conduit through which hydrogen as a gas is fed into said containing means at a specified feed pressure; (b) a heat storage medium in heat transfer connection with said metallic hydride former and, (c) a heat transfer barrier external said metallic hydride former and said heat storage medium, said system being characterized such that the mass of said containing means, said metallic hydride former and said heat storage medium is sufficient to absorb at least about 60% of the heat generated by absorbing the maximum capacity of said hydrogen in said metallic hydride former without the temperature of said metallic hydride former rising from an initial temperature to a temperature at which said metallic hydride former will have an equilibrium hydrogen pressure equal to said specified feed pressure.

* * * * *